United States Patent
Hecht

[15] 3,698,171
[45] Oct. 17, 1972

[54] MECHANICAL PICKER FOR STRAWBERRIES

[72] Inventor: Charles L. Hecht, Route 2, P. O. Box 237, Scio, Oreg. 97374

[22] Filed: Aug. 31, 1970

[21] Appl. No.: 68,336

[52] U.S. Cl.................56/331, 56/DIG. 15, 56/16.5, 56/127
[51] Int. Cl. ............................................A01g 19/00
[58] Field of Search....56/331, 330, 127, 327, 328 R, 56/33, 34, 10.4, DIG. 15, 13.3

[56] References Cited

UNITED STATES PATENTS

| | | | |
|---|---|---|---|
| 3,107,475 | 10/1963 | Gustafson | 56/328 R |
| 1,907,467 | 5/1933 | Tervo et al. | 56/330 X |
| 3,307,338 | 3/1967 | Mizzi | 56/13.3 |
| 3,088,264 | 5/1963 | Sallee | 56/DIG. 15 |

FOREIGN PATENTS OR APPLICATIONS

| | | | |
|---|---|---|---|
| 1,144,662 | 3/1969 | Great Britain | 56/331 |

Primary Examiner—Louis G. Mancene
Assistant Examiner—J. N. Eskovitz
Attorney—Clarence A. O'Brien and Harvey B. Jacobson

[57] ABSTRACT

A self-propelled strawberry harvester including a series of picking fingers which move along close to the ground so as to engage under and lift the berry clusters for a severing thereof from the plant by a sickle bar. A leafer belt moves the clusters rearwardly up onto and along the fingers to the sickle bar and upwardly therefrom onto an upwardly and rearwardly inclined conveyor elevator which in turn discharges the severed clusters onto a foraminous belt for movement through a cleaning unit consisting of an underlying blower fan and an overlying suction fan. The cleaned clusters are subsequently discharged into a collection box or container. The height of the picking head is vertically adjustable in response to variations in ground level. The sickle utilizes elongated narrow knives and ledger plates on equal spacing with the picking fingers.

24 Claims, 11 Drawing Figures

Charles L. Hecht
INVENTOR.

Charles L. Hecht

MECHANICAL PICKER FOR STRAWBERRIES

The present invention is generally concerned with the harvesting of strawberries, and more particularly relates to a unique strawberry harvester wherein the berries are severed from the plant, cleaned of excess foliage, debris and the like, and loaded into a container automatically and without damage to either the berries or the plants.

It is a primary object of the instant invention to provide a device for the harvesting of strawberries wherein the berry clusters are gently lifted and severed from the plants and subsequently cleaned of loose foliage and debris. The severing of the clusters from the plants is effected at a low level, the clusters being raised only approximately 1½ inches, in order to avoid any tendency to strip the berries from the plant and thereby damage both the berries and the plant.

Other significant advantages of the harvester of the instant invention include the provision of a sickle bar which evenly receives and smoothly severs the berries, the orientation of the driver's seat at the front thereof so as to afford clear visibility of the berries both in front of and immediately at the picking head, the provision of automatic means for maintaining the ground skimming orientation of the lifting fingers regardless of variations in the ground level, and the use of combined blower and suction fans to effect a positive separation and removal of debris. The operation of the various components is effected primarily through the utilization of individual hydraulic motors whereby the inefficiency and maintenance problems normally associated with belts, chains and the like are avoided.

The harvesting apparatus of the instant invention is mounted on a self-propelled chassis to one side of the forwardly located operator's compartment and is so constructed as to harvest a single row of strawberries. However, it is also contemplated that any number of such harvesting apparatus can be used, orientated in parallel relation to each other so as to accommodate a corresponding number of adjacent rows. Each of the harvesting devices straddles a row and effectively harvests the berries thereon through an initial raising of the berries by the lifting fingers, a severing of the berries from the plant by the sickle bar and a movement of the severed berries upwardly and rearwardly over a double fan cleaning unit for discharge into a container mounted to the rear thereof. A vertically adjustable leafer belt assists the lifting fingers in the initial raising and rearward movement of the berries, and a pair of laterally spaced and forwardly located coulters move along the opposed sides of the row for a severing of the lateral runners, the leafer belt drawing these lateral runners into the picking head for the harvesting of any berries thereon.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Referring now more specifically to the drawings, the mechanical picker or harvesting machine of the instant invention is generally designated by reference numeral 10. This apparatus is to be self-propelled, and as such, includes a mobile chassis 12 mounted on rear drive wheels having enlarged flotation tires 14 thereon, and smaller front tired steering wheels 16. The machine is preferably driven by a gasoline engine 18 and includes an appropriate hydrostatic transmission 20. The engine 18 also drives a hydraulic supply pump 22 from which the various component motors are operated, as shall be explained subsequently.

The operator's seat 24 and the steering unit 26 are located at the front or forward end of the chassis, centrally between the steering wheels and at an elevated height so as to provide a clear view of the field and the picking operation.

The actual support of the forward end of the chassis 12 on the steering wheels 16 is effected through a support frame 28 which includes a pair of wheel mounting yokes or pedestals 30 interconnected at the upper ends thereof by a transverse chassis spanning beam 32. A pair of elongated arms 34 are rigid with the beam 32, inward of the steering wheels 16, and project rearwardly for pivotal engagement, as at 36, with the upper ends of a pair of chassis mounted uprights 38. A pair of rigid right angular link members 40 are provided beneath the support frame beam 32, each having the apex thereof pivotally affixed to the beam 32 by a depending ear 42 generally vertically aligned with the fixed end of one of the rearwardly directed arms 34. The two angularly related arms or portions of each member 40 diverge downwardly with the forward portion having the extreme end there of pivotally engaged with a short depending link 44 which is in turn pivotally affixed to the extreme forward end of the chassis 12, or more specifically a rigid upstanding plate 46 affixed thereto. The rearwardly directed link portion has the extreme end thereof fixed to the forward end of a piston rod 48 telescopically associated with a double-acting hydraulic cylinder 50 which in turn has the rear end portion thereof pivotally engaged with an upright 52 also rigid with the chassis 12. As will be appreciated, two such linkage units are provided, one along each of the two opposed side beams of the chassis 12.

Figure 1:
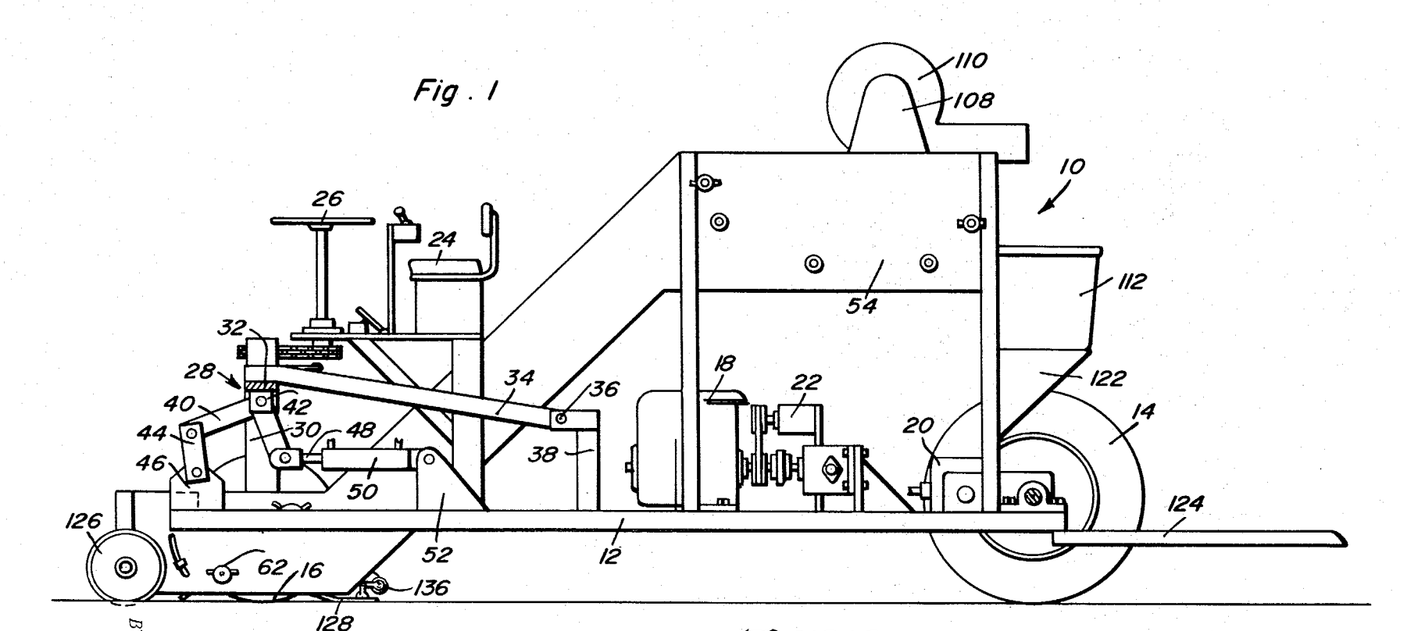
FIG. 1 is a side elevational view of the mechanical picker or harvester of the instant invention.
Figure 7:
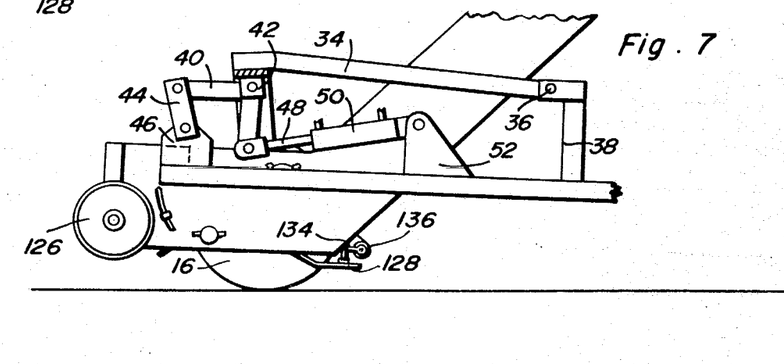
FIG. 7 is a side elevational view of the forward portion of the apparatus illustrating the elevated position thereof.
Figure 8:
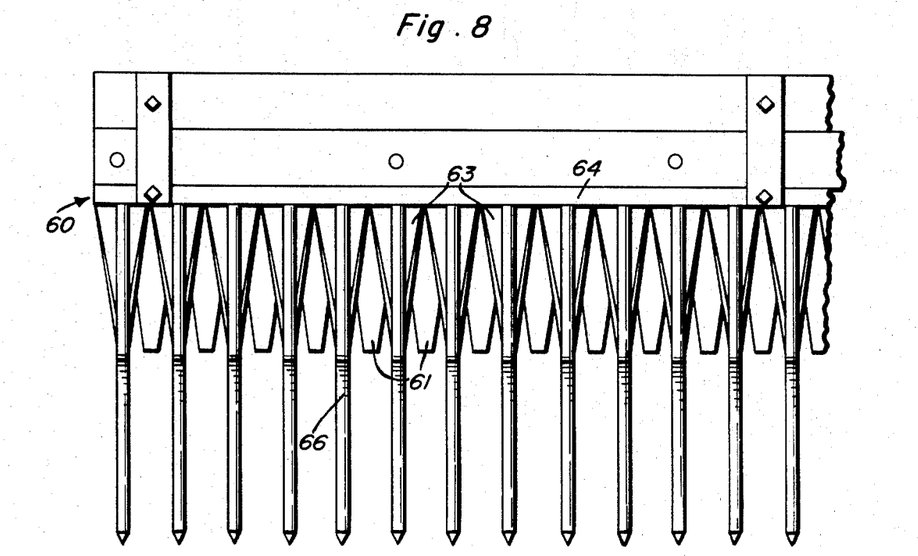
FIG. 8 is an enlarged plan view of a portion of the sickle bar and the overlying picking fingers, illustrating the relationship therebetween.
Figure 9:
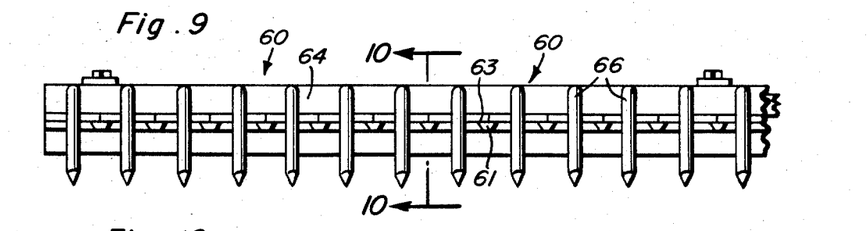
FIG. 9 is a front elevational view of the structure of FIG. 8.
Figure 10:
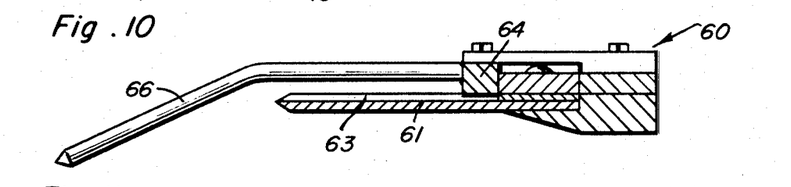
FIG. 10 is an enlarged cross-sectional view taken substantially on the plane passing along line 10—10 in FIG. 9.
Figure 11:
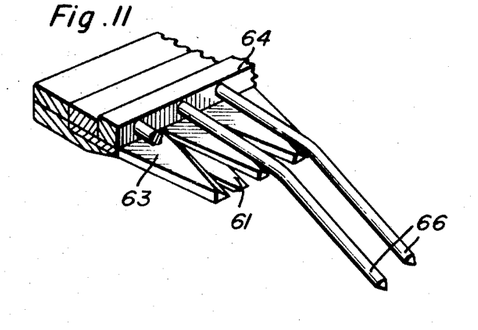
FIG. 11 is a perspective detail of a portion of the sickle bar and associated picking fingers.

As will be recognized from a comparison of FIGS. 1 and 7, the selective extension and retraction of the piston rod 48 controls the elevation of the chassis 12 relative to the front wheels 16, the chassis pivoting about the rear wheels 14 or the axle therefor. This selective variation in the elevation of the forward portion of the chassis is significant in adjusting the picking head portion of the harvesting unit itself which shall be described in detail presently. In operation, as the piston rods 48 are extended, the rigid angular link members 40 swing about the pivotal engagement thereof with the cross beam 32 and effect a raising of the front of the chassis 12 relative to the overlying support frame cross beam 32. This vertical adjusting of the chassis frame 12 is, insofar as the stabilizing arms 34 are concerned, accommodated in the pivot joints provided at the rear ends thereof.

The picking unit itself, only one such unit having been illustrated in the drawings, is mounted longitudinally on the chassis 12 to one side of the operator's seat 24. The unit includes a pair of full length side walls 54 between which the various operating components are mounted. An appropriate top wall 56 can also be provided if so desired.

The forward lower portion of the picking unit constitutes the picking head 58 and includes a transverse sickle bar 60 having stationary lower ledger plates 61 and a reciprocating upper knife, the knife sections 63 of which are orientated in close sliding proximity to the ledger plates. The reciprocating knife is driven by an appropriate hydraulic motor 62 mounted on one of the side walls. An appropriate bar 64 overlies the reciprocating knife, with this bar mounting a series of forwardly projecting lifting fingers 66. The lifting fingers 66 are mounted parallel to each other along the length of the sickle bar at approximately one inch centers, the fingers themselves preferably being formed of ⅜-inch steel rods. Each of the fingers 66 extends horizontally forward over the sickle bar 60 and, at a point forward of the sickle bar, angles downwardly and forwardly to terminate in a forward slightly pointed end located approximately one inch below the sickle bar 60, which in turn is orientated approximately one-half inch below the horizontal portion of the lifting finger 66. In this manner, the berry clusters will only be raised approximately 1½ to 2 inches prior to a severing of the clusters from the plants by the sickle bar 60. This in turn will avoid any tendency to strip the berries from the plant or exert a plant damaging pull on the plants.

The sickle bar 60 is specifically constructed for the harvesting of strawberries and the like. As such, both the knife sections 63 and the ledger plates 61 are of an elongated narrow tapered configuration, each tapering from a base approximately 1 inch wide to a leading end or point approximately one-quarter inch wide. In this manner, there is provided a substantially greater number of ledger plates and cooperating knife sections as compared to a conventional sickle bar. This in turn results in a substantial increase in the cutting speed of the sickle which eliminates the possibility of clogging or having berries slip through the sickle sections. It will also be appreciated that the spacing of the ledger plates and knife sections corresponds to the 1-inch spacing of the picking fingers 66. In this manner, the plant material, with the upwardly held clusters, is evenly fed into cooperating sickle bar sections for a smooth severing of the clusters from the plant along the line of introduction to the sickle bar without a twisting or pulling on the plant such as could occur where conventional wide sickle sections are used. Damage to the fruit and plants is thereby reduced to a minimum.

A flat berry transferring plate or panel 67 is provided transversely between the side walls 54 and angles upwardly from the inner ends of the lifting fingers 66, immediately to the rear of the plant severing portion of the sickle bar 60, to a rearwardly located slightly elevated point overlying the lower end of a conveyor elevator 68.

An upwardly and rearwardly inclined leafer belt 70 overlies the lifting fingers 66 and panel 67 in spaced relation thereabove. This leafer belt 70 assists in gathering and guiding the berry clusters up onto the lifting fingers 66 and continues the rearward movement of the clusters beyond the sickle bar 60 and along the plate 67 to the elevator 68. If so desired, a moving belt (not illustrated) can be substituted for the upper portion of the plate 67, this belt having the lower end thereof underlying the lower portion of plate 67.

In order to effect a gentle yet positive handling and movement of the berries, the leafer belt 70 is formed of a series of transverse nylon brushes 72 affixed to a pair of longitudinally extending roller chains 74 transversely thereacross and in parallel relation to each other. The two chains 74 are in turn engaged, in each instance, about upper and lower sprockets 76 and 78. The upper sprockets 76 are keyed to a transverse shaft 80, the opposite ends of which are appropriately supported for rotation within the opposed housing walls 54, this shaft 80 constituting the powered shaft and being driven by an appropriate hydraulic motor. The lower sprockets 78 are in turn rotatably received about a lower shaft 82, the opposite ends of which are received within vertically elongated slightly arcuate slots 84 defined in the opposed side walls 54 whereby a vertical pivoting adjustment of the leafer belt 70 can be effected. By the same token, the leafer belt can be appropriately raised for a cleaning of the lifting fingers and sickle bar. The shafts 80 and 82 are braced relative to each other by a pair of laterally spaced tubular members 86 extending therebetween. The upper ends of the members 86 are welded to a tube 88 which is received over the upper shaft 80 and mounted thereabout by appropriate bushing means 90 which allows for the desired rotation of the shaft 80. The lower ends of the members 86 are secured, for longitudinal adjustment, to a pair of bracket units 92 which are in turn fixed to the lower shaft 82 so as to accommodate any variation in the space between the shafts as required during the adjustment thereof or for a proper tensioning of the leafer belt.

Figure 5:
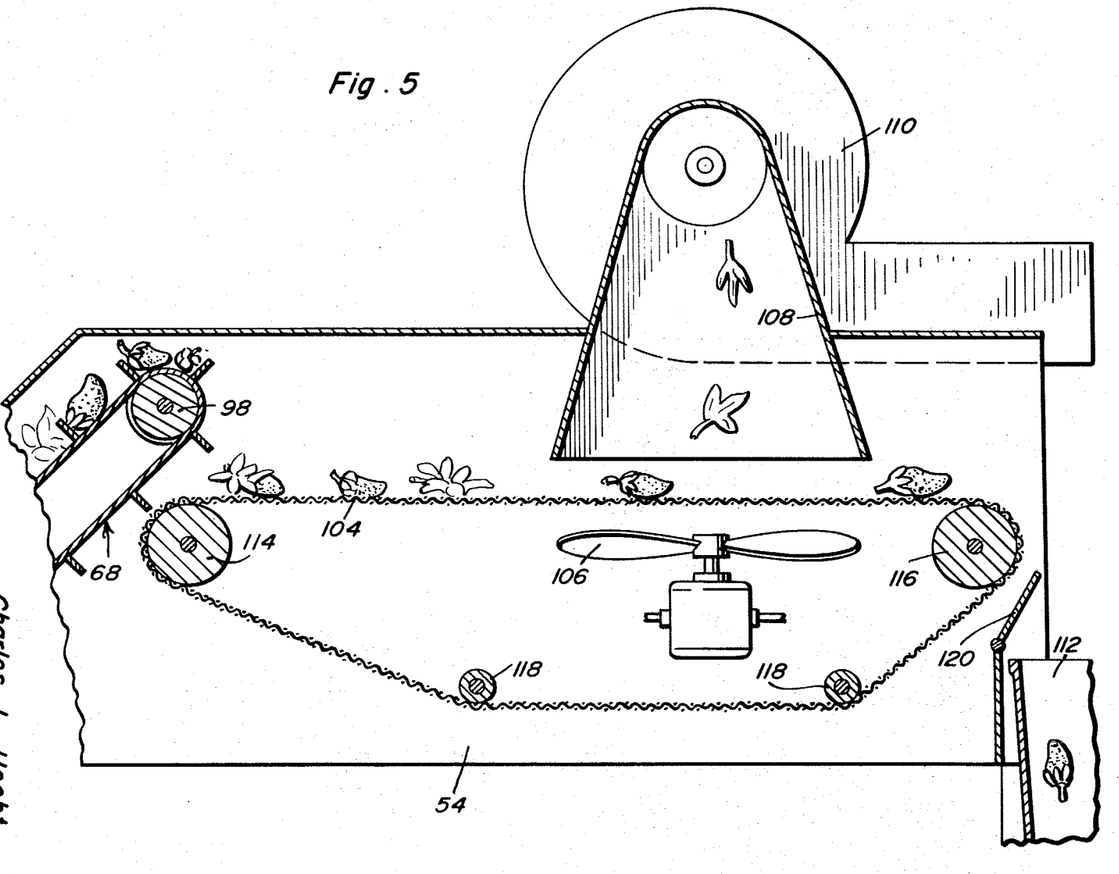
FIG. 5 is a cross-sectional view through the upper portion of the harvesting apparatus taken substantially on a plane passing along line 5—5 in FIG. 2.

The elevator 68, located immediately rearward of the leafer belt and the transfer plate 67, angles upwardly at a greater angle and consists of a flat imperforate belt 94 having a series of transverse cleats or fins 96 thereon. These fins 96 are orientated in closely spaced parallel relation to each other along the full length of the belt 94 and receive and retain the berry clusters and foliage for an elevation thereof to the cleaning portion of the device illustrated in FIG. 5. The upper and lower ends of the elevator belt 94 engage about upper and lower rollers 98 and 100. The upper roller is preferably the powered roller, being driven by an appropriate hydraulic motor. The lower roller 100 is positioned below the upper edge of the transfer plate 67 in a position so as to positively receive the harvested materials therefrom. In addition, an arcuate guard plate 102 is provided about the lower end of the elevator 68 so as to accommodate and position for pickup any materials which might not initially be engaged by one of the belt fins 96.

The fruit, foliage and debris is discharged from the upper end of the elevator 68 onto a screen-like or foraminous cleaning unit conveyor 104. This conveyor 104 transports the material horizontally rearward over a blower-type fan 106 which lifts the foliage, unattached stems, and other debris upwardly away from the relatively heavier fruit. As will be appreciated, the blower fan is located below the horizontal upper run of the conveyor or belt 104 and discharges upwardly therethrough. Immediately above the belt 104 in alignment with the blower fan 106 is a downwardly directed hood 108. The sides of the hood 108 diverge downwardly with the lower end of the hood being spaced a sufficient distance above the conveyor 104 so as to allow for a passage of the harvested material therebeneath. The hood is directly communicated with a side located suction fan 110 operative so as to draw inwardly through the hood 108 and discharge outward of the machine 10. In actual operation, the blower fan 106 will elevate the debris, foliage, and the like to a sufficient height whereby such materials can be picked up by the suction fan unit and drawn upwardly for discharge, leaving the cleaned fruit for gathering within an appropriate box or container 112 located to the rear of the conveyor 104. As will be appreciated from FIG. 5, the foraminous conveyor or conveyor belt 104 engages about forward and rear rollers 114 and 116, as well as a pair of smaller intermediate rollers 118 which extend the conveyor 104 below the internally mounted blower fan 106. The rear roller 116 will normally be the powered roller and be driven by an appropriate hydraulic motor. The two fans 106 and 110 will likewise be driven by independent hydraulic motors.

Mounted immediately at the discharge end of the cleaning unit conveyor 104 and angled upwardly and rearwardly therebelow is a flat plate-like deflector 120 which acts so as to deflect rocks and other heavy debris which would not normally be removed by the two fans. The lighter fruit will, upon being discharged from the conveyor 104, be thrown slightly rearward into the container 112, passing over the upper edge of the relatively closely positioned deflector 120, while the heavier rocks will merely drop off the discharge end of the conveyor 104, engage the deflector 120, and be dropped directly through the machine onto the ground. In this manner, the cleaning apparatus associated with the machine provides not only for the removal of the lighter debris, but also the heavier debris. It will of course be recognized that appropriate adjustments will have to be made in the speed at which the cleaning fans operate and the specific angular orientation of the deflector 120.

Noting FIG. 1, the containers 112 are positioned on an elevated platform 122 for a reception of the berries therein, the filled container 112 being replaced by an empty container and normally stacked on a rearwardly projecting platform 124 provided on the machine whereby a continuous harvesting operation can be proceeded with.

Turning again to the forward portion of the harvesting apparatus, a pair of side coulters 126 are rotatably mounted on the forwardmost portions of the side support walls 54 and operate so as to sever lateral plant runners which may extend to the opposite sides of the row being harvested. These runners are then drawn into the harvesting apparatus by the brush bearing leafer belt 70 for an efficient harvesting of the fruit therefrom.

If deemed desirable, particularly in fields that have heavy fruit on the outer sides of the rows, the coulters 126 can be replaced by a pair of vertically orientated rotating cylinders (not illustrated). Each cylinder will be approximately 2 inches in diameter and have a spiral flight thereon from five-eighths inch to 1½ inch deep. The cylinders rotate in a manner so as to lift the fruit with the forward movement of the machine moving the fruit into the middle of the row for a lifting and harvesting thereof in the aforedescribed manner. The cylinders will preferably be mounted for lateral adjustment in accordance with the width of the row. In addition, each cylinder will normally have a forwardly and downwardly projecting rod associated therewith. These rows will slightly pierce the soil forward of the cylinders and raise the vine slightly for engagement by the rotating cylinders.

The instant invention also contemplates means for automatically maintaining the height of the picking head portion of the apparatus. As such, a ground level sensing shoe 128 is pivoted to a bottom plate 130 provided immediately behind the sickle bar 60. The shoe 128 extends downwardly and rearwardly from the point of pivotal engagement, designated by reference numeral 132, and terminates in a horizontal portion which rides along the ground. Appropriate linkage means 134 extends upwardly from the rear portion of the shoe 128 and engages a control valve 136. This control valve 136 is in turn so orientated as to control the flow of fluid to the positioning cylinders 50 which vertically orientate the picking head portion of the apparatus as previously described. The depth control unit is to be so adjusted as to maintain the sickle bar approximately one inch above the ground level, the lifting fingers 66 thereby operating so as to elevate the berry clusters approximately 1½ inches at the time of the severance thereof from the plants. In this manner, while the clusters are lifted upwardly out of the path of the sickle bar for a non-damaging cutting of the clusters from the plants, there is no pull exerted on the clusters or plants such as might damage the fruit or plants. An appropriate manual override can be provided in the elevating system so as to enable a raising of the picking end portion of the apparatus, as illustrated in FIG. 7, for road travel and the like.

Figures 2, 6:
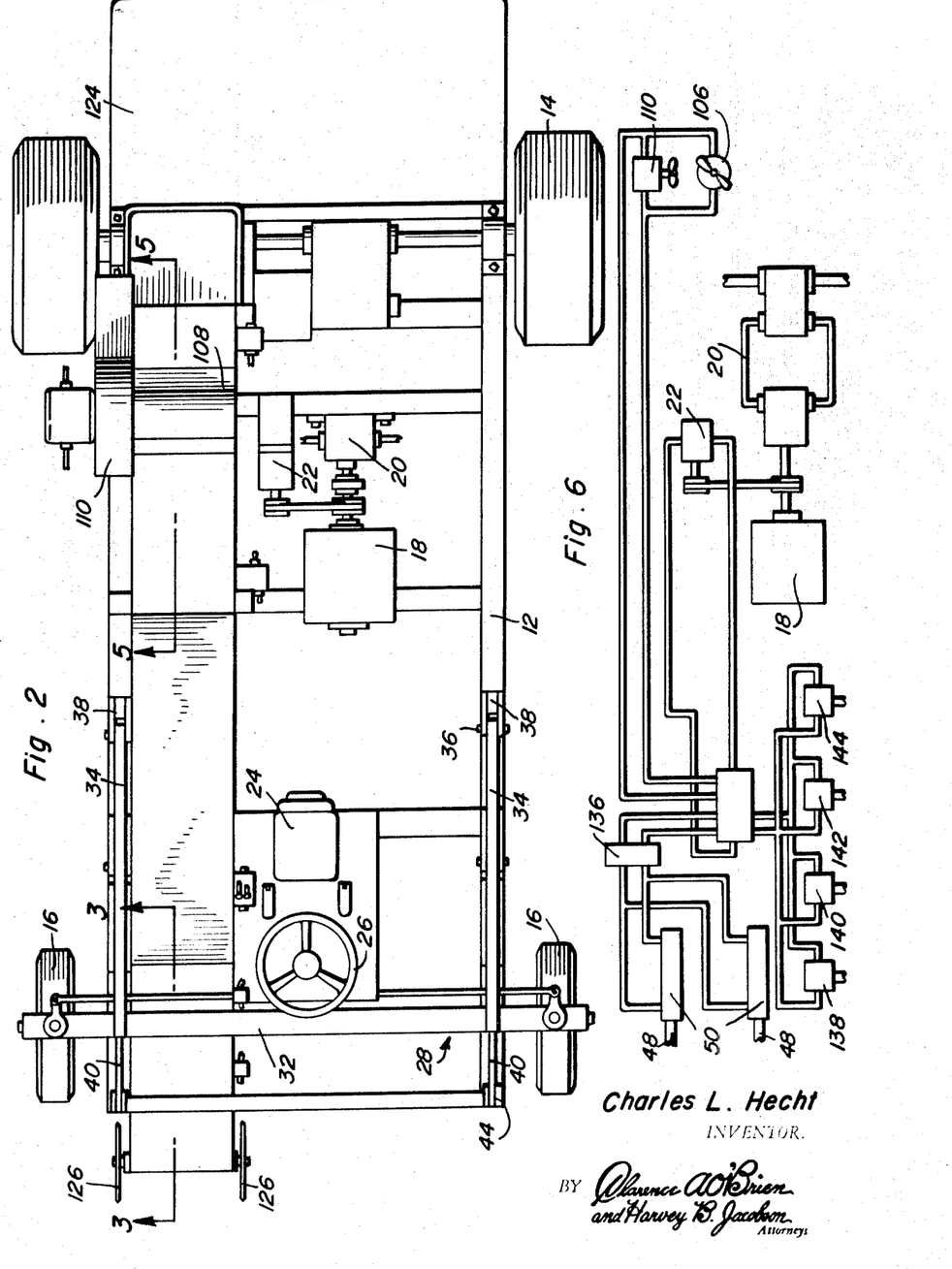
FIG. 2 is a top plan view of the apparatus.
FIG. 6 is a schematic illustration of the operating system of the apparatus.
Figure 3:
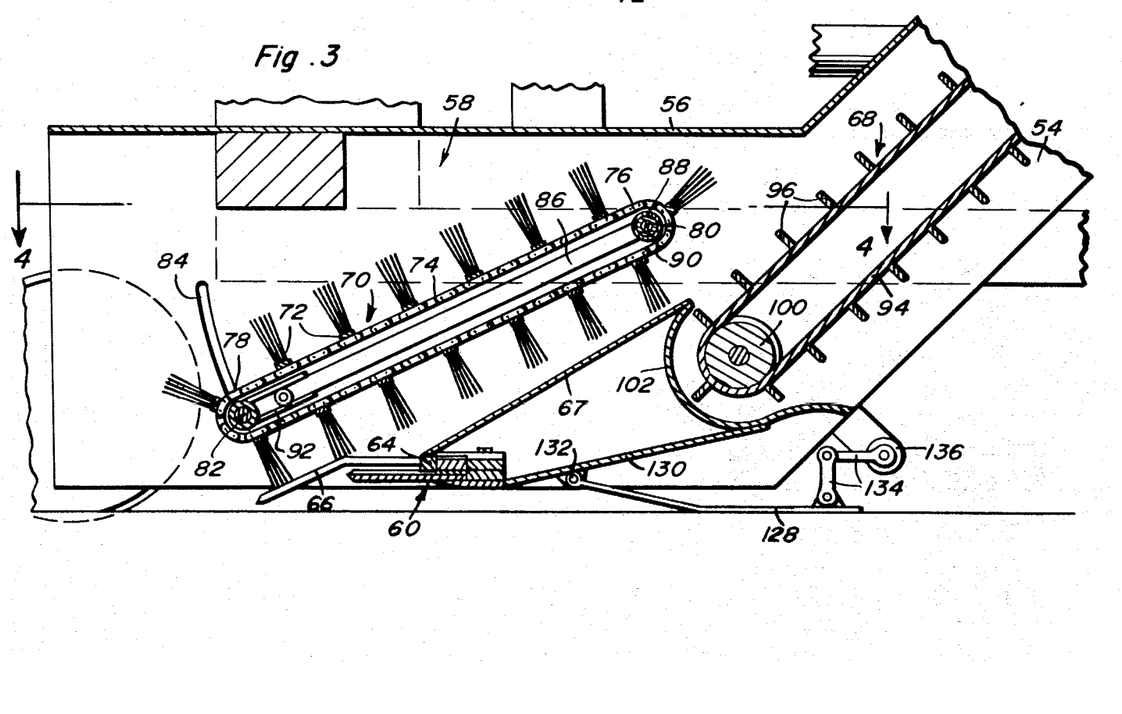
FIG. 3 is an enlarged cross-sectional view through the picking head portion of the apparatus taken substantially on a plane passing along line 3—3 in FIG. 2.
Figure 4:
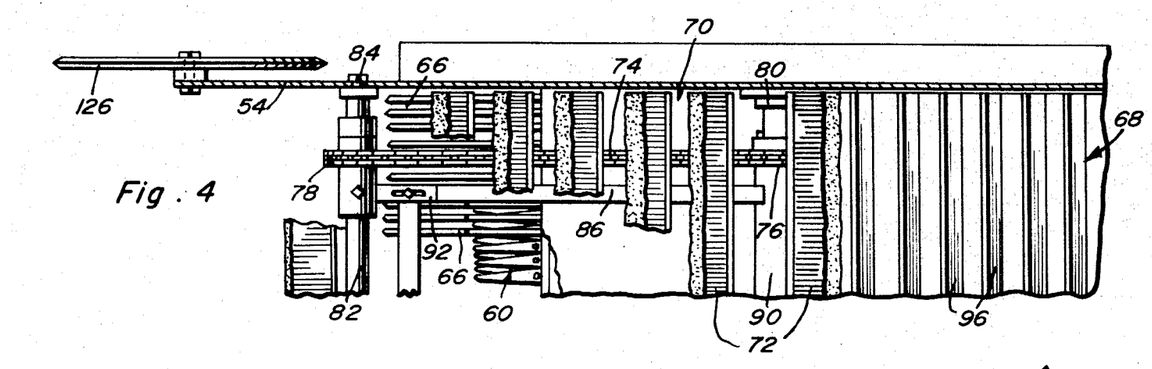
FIG. 4 is a cross-sectional detail taken substantially on a plane passing along line 4—4 in FIG. 3 with portions broken away for purposes of illustration.

FIG. 6 schematically illustrates, in a general manner, a drive system for the various components. The sickle bar motor, leafer belt motor, elevator motor and screen conveyor motor have been respectively designated by reference numerals 138, 140, 142, and 144.

The actual harvesting apparatus is to be approximately 18 inches wide and, while only one such unit has been illustrated as mounted on the chassis in FIG. 2, it should be appreciated that any reasonable number of units can be provided in spaced parallel relation to each other so as to accommodate a plurality of adjacent rows of plants. During the harvesting operation, the strawberries are handled gently at all stages, from the initial rearward brushing of the berries, through flexible brush-like lifter members, to the nested retaining of the berries on the elevator and the horizontal carrying of the berries through the cleaning apparatus for discharge into a container located immediately to the rear thereof.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A picker for strawberries and like crops, comprising, in combination:
   a. a mobile chassis movable along a crop row;
   b. means mounted on said chassis for severing a crop in the crop row from a plant associated with the crop; and
   c. means including a plurality of fingers also mounted on said chassis adjacent the severing means with rear ends thereof projecting horizontally forward over said severing means and terminating in downwardly and forwardly angled forward portions which project to a plane below the severing means for engaging beneath the crop upon a forward movement of said chassis and lifting same into communication with said severing means for severing of the crop.

2. The picker of claim 1, including crop elevating means arranged for receiving the severed crop, and crop cleaning means arranged for receiving the crop from said crop elevating means, said crop cleaning means discharging a cleaned crop.

3. The picker of claim 2 wherein said cleaning means comprises a generally horizontal foraminous belt, blower means positioned beneath said belt and discharging upwardly therethrough, and suction means orientated over said belt in general alignment with the blower means for cooperative action therewith in raising and removing debris from the belt carried crop.

4. The picker of claim 3 including crop moving means positioned over the lifting means and extending rearwardly therefrom beyond the severing means and approximately to the lower portion of the elevating means, said crop moving means operating so as to move the crop rearwardly along the lifting means, through the severing means and onto the elevating means.

5. The picker of claim 4 wherein said crop moving means comprises a series of soft flexible members mounted for continuous travel in the manner of an endless belt.

6. The picker of claim 5 including a crop transferring plate extending from the rear of the lifting means fingers upwardly at an angle to the lower portion of the crop elevating means, said crop moving means overlying said transfer plate.

7. The picker of claim 6 wherein said elevating means is an endless conveyor having a series of upstanding cleats positioned laterally thereacross in parallel relation to each other and defining crop receiving pockets.

8. The picker of claim 7 wherein said chassis includes a frame, rear wheels mounting and supporting the rear of the frame, and a front wheel unit engaged with and supporting the front of the frame, the front portion of said frame being pivotally adjustable about the rear wheels and generally vertically adjustable relative to the front wheel unit, and means engaged between the front portion of the chassis frame and the front wheel unit for effecting the adjustment therebetween.

9. The picker of claim 8 wherein the means for effecting the adjustment between the front of the frame and the front wheel unit includes a power cylinder operable in response to variations in the ground level.

10. The picker of claim 2 including crop moving means positioned over the lifting means and extending rearwardly therefrom beyond the severing means and approximately to the lower portion of the elevating means, said crop moving means operating so as to move the crop rearwardly along the lifting means, through the severing means and onto the elevating means.

11. The picker of claim 9, wherein said plurality of fingers is a series of rod-like fingers mounted in parallel spaced relation to each other.

12. The picker of claim 10 including a crop transferring plate extending from the rear of the lifting means fingers upwardly at an angle to the lower portion of the crop elevating means, said crop moving means overlying said transfer plate.

13. The picker of claim 1, wherein said plurality of fingers is a series of rod-like fingers mounted in parallel spaced relation to each other.

14. The picker of claim 1 wherein said chassis includes a frame, rear wheels mounting and supporting the rear of the frame, and a front wheel unit engaged with and supporting the front of the frame, the front portion of said frame being pivotally adjustable about the rear wheels and generally vertically adjustable relative to the front wheel unit, and means engaged between the front portion of the chassis frame and the front wheel unit for effecting the adjustment therebetween.

15. The picker of claim 14 wherein the means for effecting the adjustment between the front of the frame and the front wheel unit includes a power cylinder operable in response to variations in the ground level.

16. A mechanical picker for strawberries and like crops including a mobile chassis movable forwardly along a crop row, lifting means on said chassis engageable beneath the crop for a raising thereof upon a forward movement of the mobile chassis along a crop row, severing means mounted generally rearward and below said lifting means for a severing of the raised crop from the plants, crop elevating means receiving said crop rearward of the severing means, and crop cleaning means positioned rearward of the elevating means for a reception of the crop therefrom, said crop cleaning means discharging the cleaned crop rearward thereof, said lifting means comprising a series of rod-like fingers mounted in parallel spaced relation to each other, said fingers having forward and rear ends, the rear ends of said fingers being secured over said severing means with the fingers projecting horizontally forward over said severing means and terminating in downwardly and forwardly angled forward portions which project to a plane below the severing means for lifting engagement with the crops.

17. The picker of claim 16 including a crop transferring plate extending from the rear of the lifting means fingers upwardly at an angle to the lower portion of the crop elevating means, said crop moving means overlying said transfer plate.

18. The picker of claim 16 wherein said severing means is a sickle bar comprising a series of fixed narrow elongated ledger plates and reciprocating overlying narrow elongated knife sections cooperatively orientated relative to the ledger plates, the spacing between adjacent knife sections and adjacent ledger plates being substantially equal to the spacing between the fingers.

19. The picker of claim 18 wherein the knife sections, ledger plates and fingers are all spaced on approximately 1 inch centers.

20. The picker of claim 19 wherein each knife section and each ledger plate tapers from a base approximately 1 inch wide to a leading end approximately one-fourth inch wide.

21. For use in a mechanical picker for strawberries and the like including a picking head portion, a horizontally orientated sickle bar positionable transversely across a crop row for travel therealong, a plurality of lifting fingers, said fingers including a rear portion mounted so as to horizontally overlie the sickle bar and extend forwardly therebeyond, and a forward portion inclined downwardly forward of the sickle bar and terminating in a forwardly and downwardly directed leading end below the sickle bar for engagement beneath crops and a gradual elevation thereof to a height above the sickle bar for a severing of the crops by the sickle bar.

22. The picker of claim 21 wherein said sickle bar includes a series of fixed narrow elongated ledger plates and reciprocating overlying narrow elongated knife sections cooperatively orientated relative to the ledger plates, the spacing between adjacent knife sections and adjacent ledger plates being substantially equal to the spacing between the fingers.

23. The picker of claim 22 wherein the knife sections, ledger plates and fingers are all spaced on approximately 1-inch centers.

24. The picker of claim 21 including crop moving means overlying said fingers and sickle bar and extending from a point adjacent the forward end of the fingers to a point rearward of said sickle bar, said crop moving means comprising a series of flexible portions sequentially moved from a point adjacent the forward end of the fingers to a point rearwardly spaced relative to the sickle bar for a continuous movement of crops therealong both prior and subsequent to the severing thereof by the sickle bar during the forward travel of the picker.

* * * * *